(12) United States Patent
Zuberi et al.

(10) Patent No.: US 7,397,801 B2
(45) Date of Patent: Jul. 8, 2008

(54) METHOD AND APPARATUS TO DETERMINE WHETHER A NETWORK IS QUALITY OF SERVICE ENABLED

(75) Inventors: Khawar M. Zuberi, Bellevue, WA (US); Mathias Jourdain, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/101,962

(22) Filed: Apr. 8, 2005

(65) Prior Publication Data
US 2006/0227713 A1 Oct. 12, 2006

(51) Int. Cl.
*H04L 12/28* (2006.01)
*G01R 31/08* (2006.01)

(52) U.S. Cl. .................. 370/395.21; 370/236; 370/241

(58) Field of Classification Search ............... 370/241, 370/229–230, 395.41, 395.42, 395.43, 248, 370/236, 395.21
See application file for complete search history.

(56) References Cited

U.S. PATENT DOCUMENTS

| | | | |
|---|---|---|---|
| 4,769,811 A | 9/1988 | Eckberg, Jr. et al. | |
| 5,991,302 A | 11/1999 | Berl et al. | |
| 6,760,309 B1 | 7/2004 | Rochberger et al. | |
| 6,781,971 B1 | 8/2004 | Davis et al. | |
| 6,798,743 B1 * | 9/2004 | Ma et al. | 370/235 |
| 6,850,490 B1 | 2/2005 | Woo et al. | |
| 6,954,435 B2 * | 10/2005 | Billhartz et al. | 370/252 |
| 7,079,508 B2 * | 7/2006 | Ayyagari et al. | 370/329 |
| 2003/0093563 A1 | 5/2003 | Young et al. | |
| 2003/0189935 A1 * | 10/2003 | Warden et al. | 370/395.21 |
| 2003/0204616 A1 * | 10/2003 | Billhartz et al. | 709/235 |
| 2004/0151114 A1 | 8/2004 | Ruutu | |
| 2004/0260750 A1 | 12/2004 | Ruutu et al. | |

FOREIGN PATENT DOCUMENTS

| | | |
|---|---|---|
| EP | 1 130 855 A2 | 5/2001 |
| WO | WO-2004/100464 A1 | 11/2004 |

OTHER PUBLICATIONS

"Ucentric Announces Support of Broadcom Reference Design to Advance Whole-Home Media Center Solutions," Ucentric Systems, Jan. 7, 2005, http://www.ucentric.com/index.php?news/releases/88&PHPSESSID=fba81d211eab4d902232c9765bbc0426, 3 pages.

(Continued)

*Primary Examiner*—Kwang Bin Yao
*Assistant Examiner*—Candal Elpenord
(74) *Attorney, Agent, or Firm*—Marshall, Gerstein & Borun LLP

(57) ABSTRACT

A method and apparatus to determine whether a network is quality of service enabled is disclosed. The method may send a variety of test packets through a network and depending on how the network handles the packets, a determination may be made whether the network does not support packets with quality of service identification, tolerates packets with quality of service identification or supports packets with quality of service identification.

18 Claims, 4 Drawing Sheets

OTHER PUBLICATIONS

"Mediabolic and Equator Technologies Announce Strategic Partnership for Digital entertainment Solutions," Mediabolic, Inc., Jan. 6, 2005, http://www.mediabolic.com/press/item.php?id-183, 3 pages.
"Turnkey Professional Media Ingest, Capture, and Encoding Servers," Digital Rapids, http://www.digital-rapids.com/Products_Servers.html, 5 pages.
"High-Quality Media Distribution in the Digital Home," Intel Technology Journal, Intel Corporation, Nov. 15, 2002, http://www.intel.com/technology/itj/2002/volume06/issue04/art02_distribution/p05_infrastructure.htm, 7 pages.
"QoS Packet Shaping Server," SysMaster Corporation, 2004, http://www.sysmaster.com/s_net_qos.htm, 6 pages.
"Mediabolic Solutions Overview: Products and Services for Digital Entertainment," Mediabolic, Inc., 2005, http://www.mediabolic.com/products/index.html, 2 pages.
"Product Details," Ucentric, 2003, http://ucentric.com/index.php?products/productdetails, 14 pages.
"Products Overview: Customer Product Showcase," Digital 5, http://www.digital5.com/products/platform_overview.asp, 3 pages.
"Quality of Service," Billion, www.billion.com, 2 pages.

* cited by examiner

METHOD AND APPARATUS TO DETERMINE WHETHER A NETWORK IS QUALITY OF SERVICE ENABLED

BACKGROUND

With increased uses for network communication, the importance of maintaining quality network performance continues to increase. New methods and apparatus have been developed to assist network performance, but it can be a challenge to tell whether a particular network has the most recent network performance upgrades.

SUMMARY

A method and apparatus to determine whether a network is quality of service enabled is disclosed. The method may send a variety of test packets through a network and depending on how the network handles the packets, a determination may be made whether the network does not support packets with quality of service identification, tolerates packets with quality of service identification or supports packets with quality of service identification.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
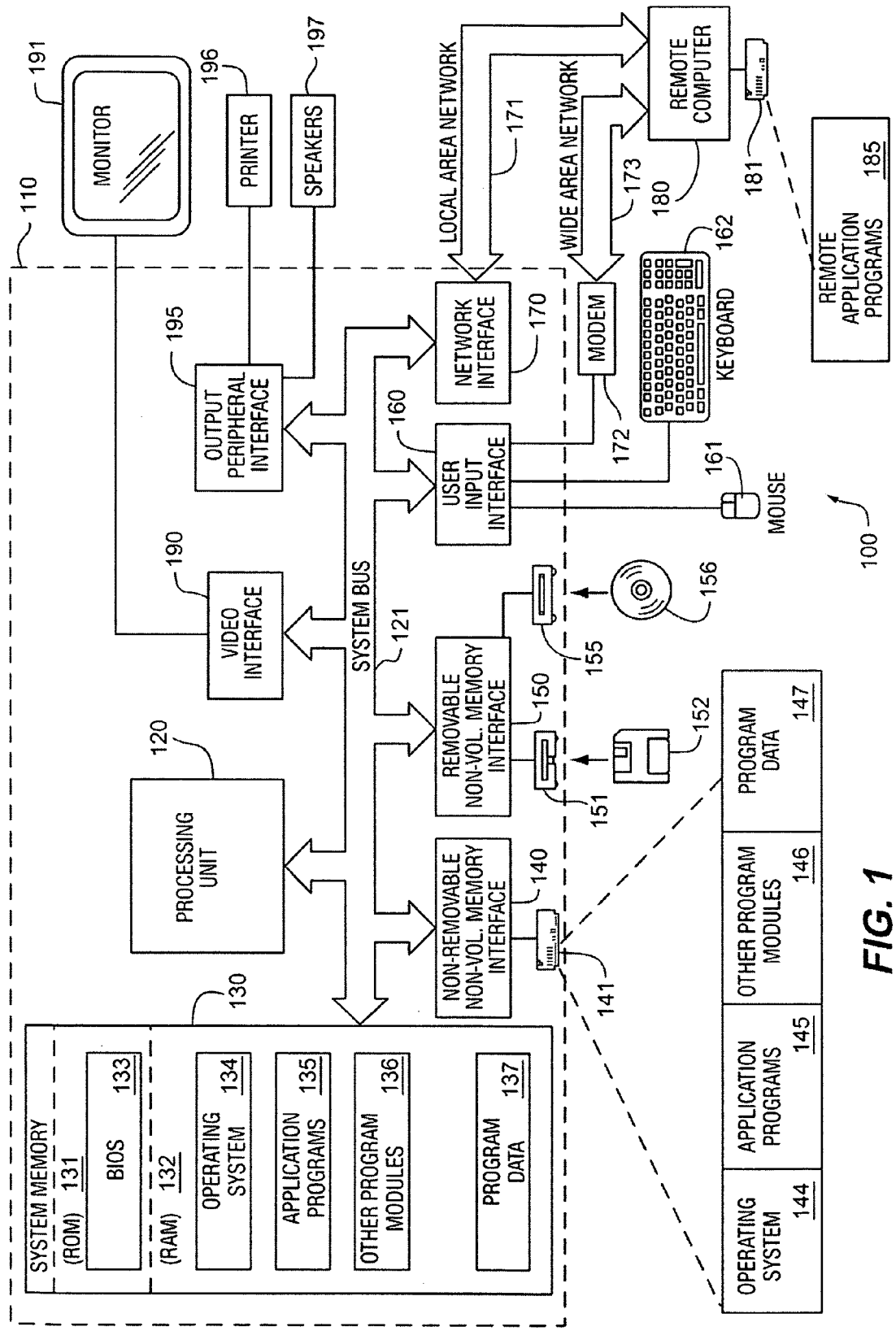
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
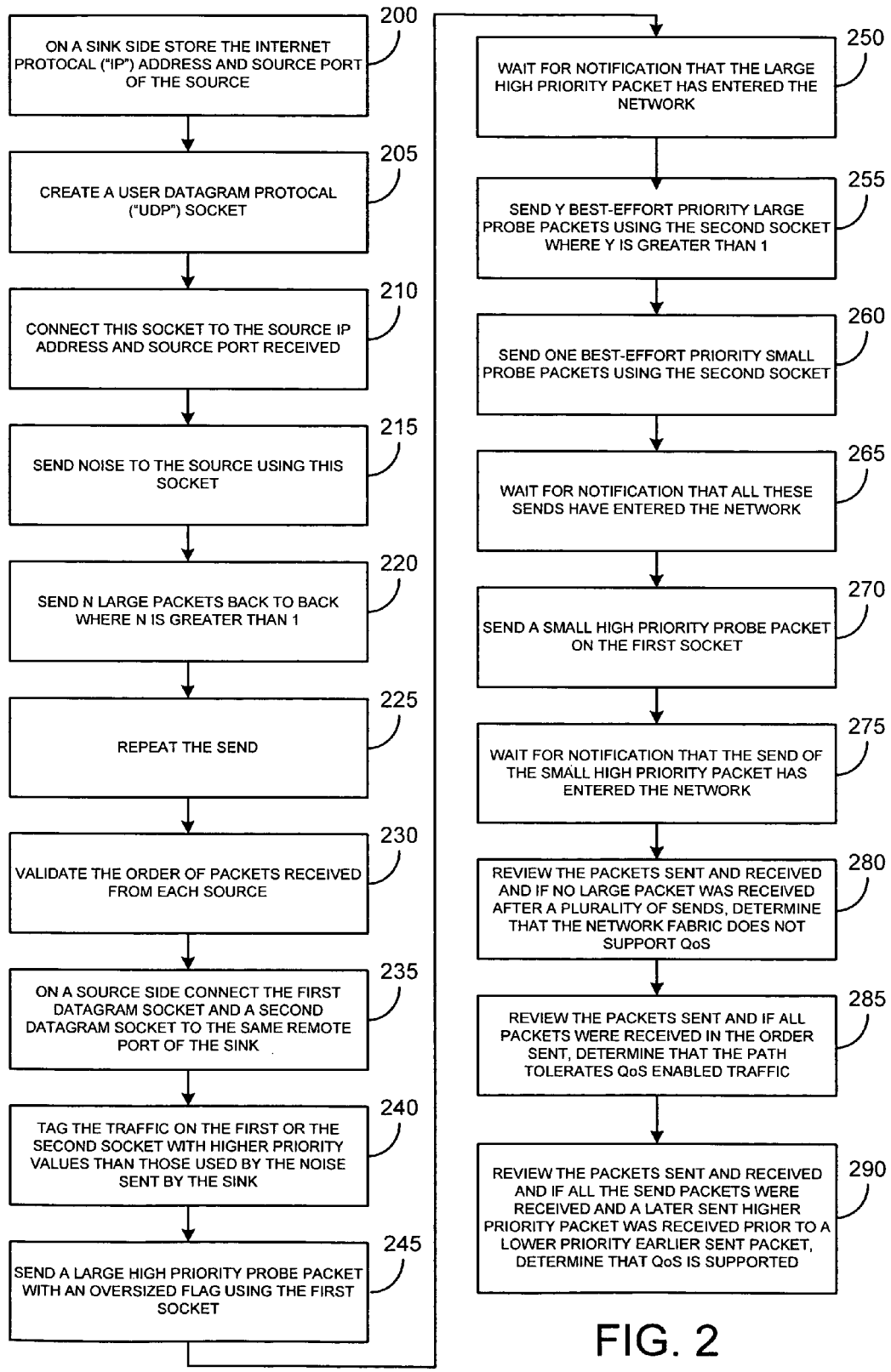
FIG. 2 is an illustration of a flowchart in accordance with the claims of the application.

FIG. 2 may illustrate a method in accordance with the claims. The method may be used to determine if a network path between a source and a sink is quality of service ("QoS") enabled. QoS allows packets to be marked or identified with levels of importance, such as high priority, which allows more important packets to pass less important packets (low priority packets) on a network path if there is sufficient congestion on a network, which also may be referred to as inversion. Not all network devices are QoS enabled and some devices tolerate packets with QoS identification while others may be incompatible with packets with QoS identification. The method may allow the determination of whether a network path cannot tolerate packets with QoS identification, will tolerate packets with QoS identification or is QoS packet enabled.

At block 200, on a Sink side, when receiving traffic from an unknown source, the method may store the Internet Protocal ("IP") address and source port of the source. At block 205, the method may create a user datagram protocol ("UDP") socket. At block 210, the method may connect this socket to the source IP address and source port received. At block 215, the method may send noise to the source using this socket a variety of ways. One way may include sending n large packets back to back where n is greater than or equal to 1 (block 220), repeating the send (block 225) and validating the order of packets received from each source (block 230). The noise from the sink may be re-sent periodically (such as every 10 ms) until the source disconnects or up to an expiring time limit (such as 200 ms). The noise may help create congestion on the network so that the low and high priority packets may be held briefly in the same network device where, if the network device is QoS enabled, the higher priority packet may be queued earlier than the low priority packet, even if the low priority packet was received earlier. For example, given a capacity of 100 Mbps, a layer-3 1500 bytes packet plus 802.11 header of 34 bytes will hold the fabric for a minimum of $(1500+34) \cdot 8/(100 \cdot 1024 \cdot 1024) = 117$ microseconds. This means both packets (the high and the low priority packets) must be received within this time period for them to be queued and inverted. Note that sending a minimal packet of 46 bytes+ 18 bytes of 802.3 header requires at most $(46+18) \cdot 8/(100 \cdot 1024 \cdot 1024) = 4.8$ microseconds. If two packets of minimal size and different priorities can be sent back to back such that the overall host overhead is less than ~100 microseconds, then sometimes the two packet trains will collide and inversion may be observed.

Figure 3:
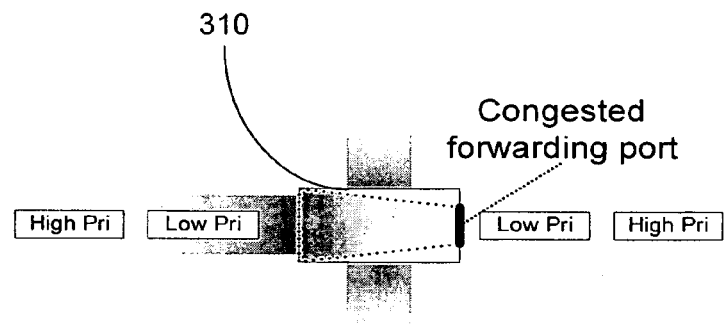
FIG. 3-5 are illustrations of networks with various points of congestion.
Figure 4:
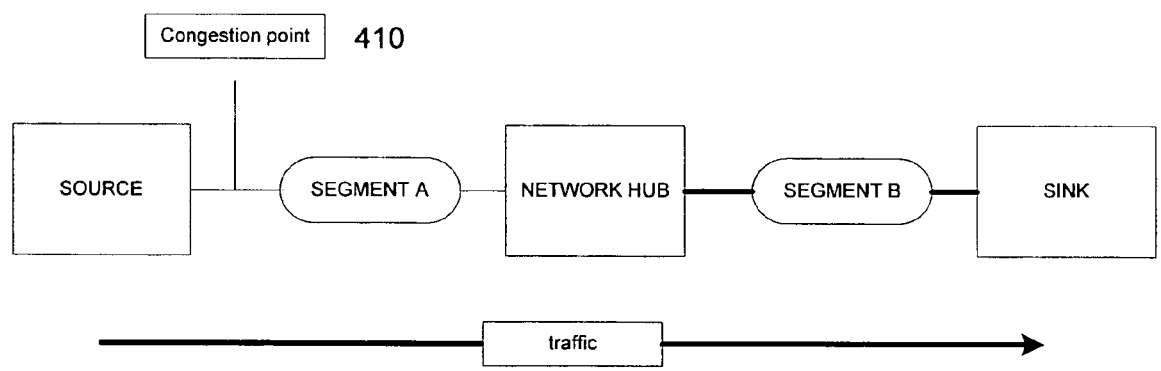
Figure 5:
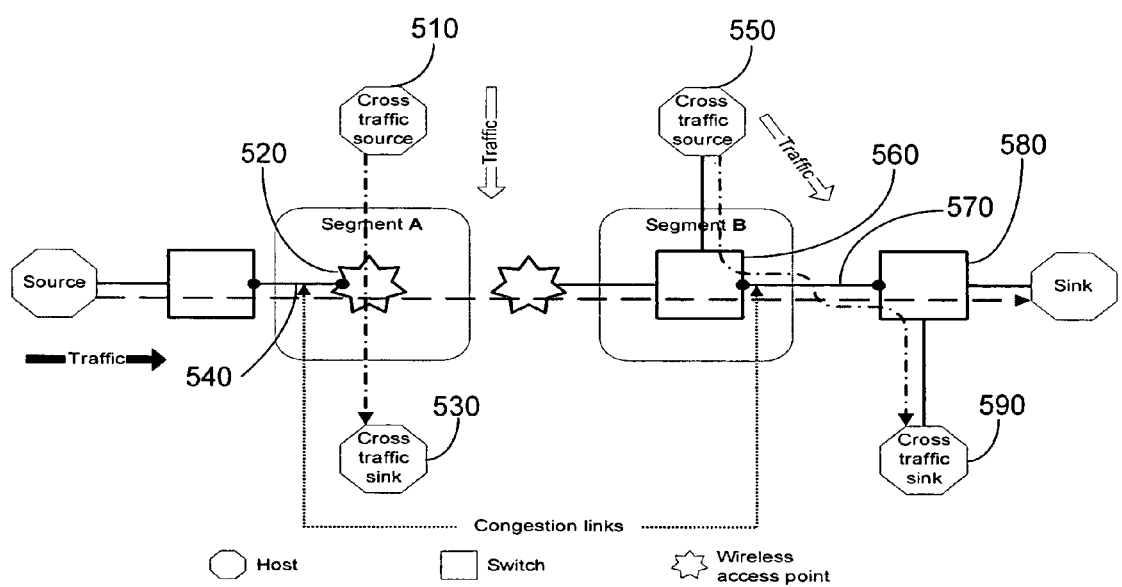

FIGS. 3-5 may illustrate collisions and how later sent higher priority packets can catch and pass earlier sent lower priority packets. Network congestion may cause packets to accumulate in a queue, in which case, packets with a higher priority may be moved up in the queue ahead of lower priority packets. Congestion may be caused by a variety of sources. In FIG. 3, congestion in a network forwarding device 310 may be caused by an inbound segment with higher bandwidth than the outbound segment. FIG. 4 illustrates a congestion point in the network as in the communication link 410 from the source to network Segment A. The hub, being a shared fabric, may result in the source's traffic queuing up in the source host as it contends with other traffic to use the shared fabric Here the congestion point may reside at the source device itself. FIG. 5 may illustrate a situation where congestion is created by cross traffic. A cross traffic source may send traffic through a wireless access point 520 to a cross traffic sink 530 which may cause congestion inside the wireless access point 520. This congestion may cause congestion inside the wireless access point 520 for data sent on link 540. In the same example, a second cross traffic source 550 may send noise through a switch 560 or other network management device along a network path 570 to another switch 580 through yet another switch 580 to a cross traffic sink 590 which may create a congestion point on the network path 570. Of course, there are virtually a limitless number of ways of creating network noise or congestions and FIG. 3 through 5 only illustrate a few examples as many more ways are possible.

Referring again to FIG. 2, at block 235, on a source side of the network, a first datagram socket and a second datagram socket may be connected to the same remote port of the sink. At block 240, the traffic on the first or the second socket may be tagged with higher priority values than those used by the noise sent by the sink. A Traffic Control ("TC") api may be used to create a flow to mark with Differentiated Service Code Point ("DSCP") and tag with 802.1p the traffic with priority values. The default values of the Controlled Load GQoS service type may be used for priority values less than those used by the source wherein the Differentiated Service Code Point ("DSCP") value is 24 or a 802.1p value of 4. Further, the default values of the Guaranteed GQoS service type may be used for higher priority packets wherein the Differentiated Service Code Point ("DSCP") value is 40 or a 802.1p value of 5. The probe packets may have a train size field that can only be used for the last packet of a train of probes where the train size field may be set to the number of packets that were immediately sent before this last packet incremented by one. The probe packets may be filled with random data. While this example may be Windows based, implementation in other operating system is possible and would follow similar priority marking schemes.

At block 245, test probes may be sent to the sink by sending a large high priority probe packet with an oversized flag using the first socket. A probe packet may include an oversized field which when selected may indicate that the packet is oversized such as of the size of 1504 bytes, a train size field that may indicate the number of packets that are part of this train and a sequence number that may have a unique identifier of the packet that increases sequentially. The packets sent may be assigned sequence numbers. In addition, all the packets may be sent as close to one another as possible.

At block 250, the method may wait for notification that the large high priority packet has entered the network. This may be to ensure that the messages actually leave the sending computer and that any packet re-queuing occurs on equipment on the network and not inside the sending computer. At block 255, y best-effort priority large probe packets may be sent using the second socket where y is greater than 1. At block 260, one or more best-effort priority small probe packets may be sent using the second socket. At block 265, the method may wait for notification that all these sends have entered the network. At block 270, a small high priority probe packet may be sent on the first socket. At block 275, the method may wait for notification that the send of the small high priority packet has entered the network.

At block 280, the packets sent and received may be reviewed and if no large packet was received after a plurality of sends, the method may determine that the network fabric does not support QoS. The relevant IEEE specification states that the maximum payload transmission unit ("MTU") for Ethernet frames is 1500 bytes of payload. However, through 802.1p tags, it is possible to insert a 4 byte tag in the frame header. This tag contains the priority value of the data frame. To simple intermediate network devices, the data frame may appear to break the 1500 byte restriction. Devices that may be unaware of 802.1p tags may discard such overly large packets. For example, if the system is not QoS enabled, the probe packet which may be 1504 bytes, may be too large for the non-QoS enabled equipment and may be dropped and may never arrive. From this, the method may determine that the network is non-QoS enabled.

At block 285, the packets sent and received may be reviewed and if all packets were received in the order sent, determining that the path tolerates QoS enabled traffic. Unlike the results of block 280, all the packets having been received implies that the network equipment did not discard the packets which indicates that the path tolerates QoS enabled traffic. However, the higher priority packets may not have arrived prior to the lower priority packets, meaning that the method cannot determine whether there was sufficient traffic on the network to allow the higher priority packet to catch and be re-queued ahead of a lower priority packet. However, all the packets did arrive, even the large packets (greater than 1500 bytes, for example), meaning the network may be QoS tolerant, but the method cannot absolutely say that the network is QoS enabled.

At block 290, the packets sent and received may be reviewed and if all the sent packets were received and a later sent higher priority packet was received prior to a lower priority earlier sent packet, determining that QoS is supported. At some point on the network, a higher priority packet was re-queued ahead of a lower priority packet, from which the method determines that the network is QoS enabled.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of determining whether a network path is quality of service (QoS) enabled comprising:
    on a sink side, when receiving traffic from an unknown source sending noise to the source using a socket comprising:
        sending n large packets back to back where n is at least 1;
    and on a source side sending test probes to the sink comprising:
        sending a large high priority probe packet with an oversized flag;
        waiting for notification that the large high priority packet has entered the network;
        sending y normal priority packets where y is greater than or equal to 1;
        waiting for notification that these normal priority packets have entered the network;
        sending at least one high priority probe packet;
        waiting for notification that the high priority packet has entered the network;
    reviewing the packets sent and received and if no large packet was received after a plurality of sends, determining that the network fabric does not support QoS;
    reviewing the packets sent and received and if all packets were received in the order sent, determining that the path tolerates QoS enabled traffic; and
    reviewing the packets sent and received and if all the sent packets were received and a later sent higher priority packet was received prior to a lower priority earlier sent packet, determining that QoS is supported.

2. The method of claim 1, further comprising when enough packets are received to ascertain the QoS properties of the path, stop the method.

3. The method of claim 1, further comprising comparing the order of packets received to the order the packets were sent.

4. The method of claim 1, further comprising sending all packets as close to one another as possible.

5. The method of claim 1, wherein a large probe is the largest possible size possible according to the fabric used before any priority indications are added.

6. The method of claim 1, wherein incoming probe packets from the same source comprise a sequence number of a new packet that is that incrementally larger than the previously received packet and the incoming packet sequence number is used to compare to the sent packet sequence number to determine if the sequence of the sent packets changed during transit.

7. A method of determining whether a network path is quality of service (QoS) enabled comprising:
    on a sink side, when receiving traffic from an unknown source:
        storing an Internet Protocal ("IP") address and source port of the source;
        creating a user datagram protocal ("UDP") socket;
        connecting this socket to the source IP address and source port received; and
        sending noise to the source using this socket comprising:
            sending n large packets back to back where n is greater than 1;
            repeating the send; and
            validating the order of packets received from each source;
    and on a source side:
        connecting a first datagram socket and a second datagram socket to the same remote port of the sink;
        tagging the traffic on the first or the second socket with higher priority values than those used by the noise sent by the sink; and
        sending test probes to the sink comprising:
            sending a large high priority probe packet using a mechanism by which it is possible to track which packet was oversized;
            waiting for notification that the large high priority packet has entered the network;
            sending y best-effort priority large probe packets using the second socket where y is greater than or equal to 1;
            sending one best-effort priority small probe packets using the second socket;
            waiting for notification that all these sends have entered the network;
            sending a small high priority probe packet on the first socket; and
            waiting for notification that the send of the small high priority packet has entered the network;
    reviewing the packets sent and received and if no large packet was received and some later sent lesser priority packets have been received after a plurality of sends, determining that the network fabric does not support QoS;
    reviewing the packets sent and received and if all packets were received in the order sent, determining that the path tolerates QoS enabled traffic; and
    reviewing the packets sent and received and if all the sent packets were received and a later sent higher priority packet was received prior to a lower priority earlier sent packet, determining that QoS is supported.

8. The method of claim 7, further comprising when enough packets are received to ascertain the QoS properties of the path, stop the method.

9. The method of claim 7, further comprising comparing the order of packets received to the order the packets were sent.

10. The method of claim 7, further comprising sending all packets as close to one another as possible.

11. The method of claim 7, wherein a large probe is the largest possible size possible according to the fabric used before any priority indications are added.

12. The method of claim 7, wherein a probe packet comprises:
    an oversized field when selected indicates that the packet is oversized for the fabric used;
    a train size field that indicates the number of packets that are part of this train; and
    a sequence number that is incrementally larger than the previously sent packet.

13. The method of claim 7, wherein incoming probe packets from the same source comprise a sequence number of a new packet that is that incrementally larger than the previously received packet.

14. The method of claim 7, wherein a first incoming probe packets from the same source is at least 1500 bytes before a 802.1p tag is applied which will make the packet 1504 bytes and the oversized flag will be set.

15. The method of claim 7, wherein incoming probe packets from the same source have a train size field that can only be used for the last packet of a train of probes and wherein the train size field will be set to the number of packets that were immediately sent before this packet incremented by one.

16. The method of claim 7, wherein the remainder of the incoming probe packets from the same source will be filled with random data.

17. The method of claim 7, wherein the noise from the sink will be re-sent every 10 ms until source disconnects or up to 200 ms.

18. The method of claim 7, further comprising using a Traffic Control ("TC") api to create a flow to mark with Differentiated Service Code Point ("DSCP") and tag with 802.1p the traffic with priority values.

\* \* \* \* \*